United States Patent [19]
Tidwell

[11] 3,973,918
[45] Aug. 10, 1976

[54] METHOD OF MAKING A GAS-FIRED FURNACE

[75] Inventor: James T. Tidwell, Clarksville, Tenn.

[73] Assignee: The Trane Company, La Crosse, Wis.

[22] Filed: Dec. 5, 1975

[21] Appl. No.: 638,177

[52] U.S. Cl. ............... 29/157.3 D; 29/157.3 R; 29/463; 29/196.2; 148/34; 148/127; 165/133; 427/383; 427/405
[51] Int. Cl.² ............... B23P 15/26; B21D 53/04
[58] Field of Search ............... 29/157.3 R, 157.3 D, 29/463, 196.2; 427/383 R, 383 C, 383 D, 405; 148/34, 31.5, 127; 165/133, 180; 113/118 D, 118 V

[56] References Cited
UNITED STATES PATENTS

| | | |
|---|---|---|
| 1,950,500 | 3/1934 | Loprich et al. ............... 113/118 D |
| 2,303,869 | 12/1942 | Quinlan et al. ............... 427/383 C |
| 2,682,101 | 6/1954 | Whitfield et al. ............... 427/405 |
| 3,033,705 | 5/1962 | Hanink et al. ............... 427/383 D |
| 3,058,206 | 10/1962 | Mets ............... 29/196.2 |
| 3,650,005 | 3/1972 | Kamiya et al. ............... 165/180 |
| 3,754,874 | 8/1973 | Anderson ............... 29/196.2 |
| 3,809,155 | 5/1974 | Anthony et al. ............... 165/133 |
| 3,837,894 | 9/1974 | Tucker, Jr. ............... 148/31.5 |

FOREIGN PATENTS OR APPLICATIONS

| | | |
|---|---|---|
| 722,594 | 11/1965 | Canada ............... 148/34 |
| 750,893 | 6/1956 | United Kingdom ............... 29/157.3 D |

*Primary Examiner*—C.W. Lanham
*Assistant Examiner*—Dan C. Crane

[57] ABSTRACT

This specification discloses a method of making a high efficiency gas-fired furnace with aluminized steel heat exchangers which are specially prepared for higher heat exchange efficiency by heat treatment of the heat exchanger shells.

11 Claims, 1 Drawing Figure

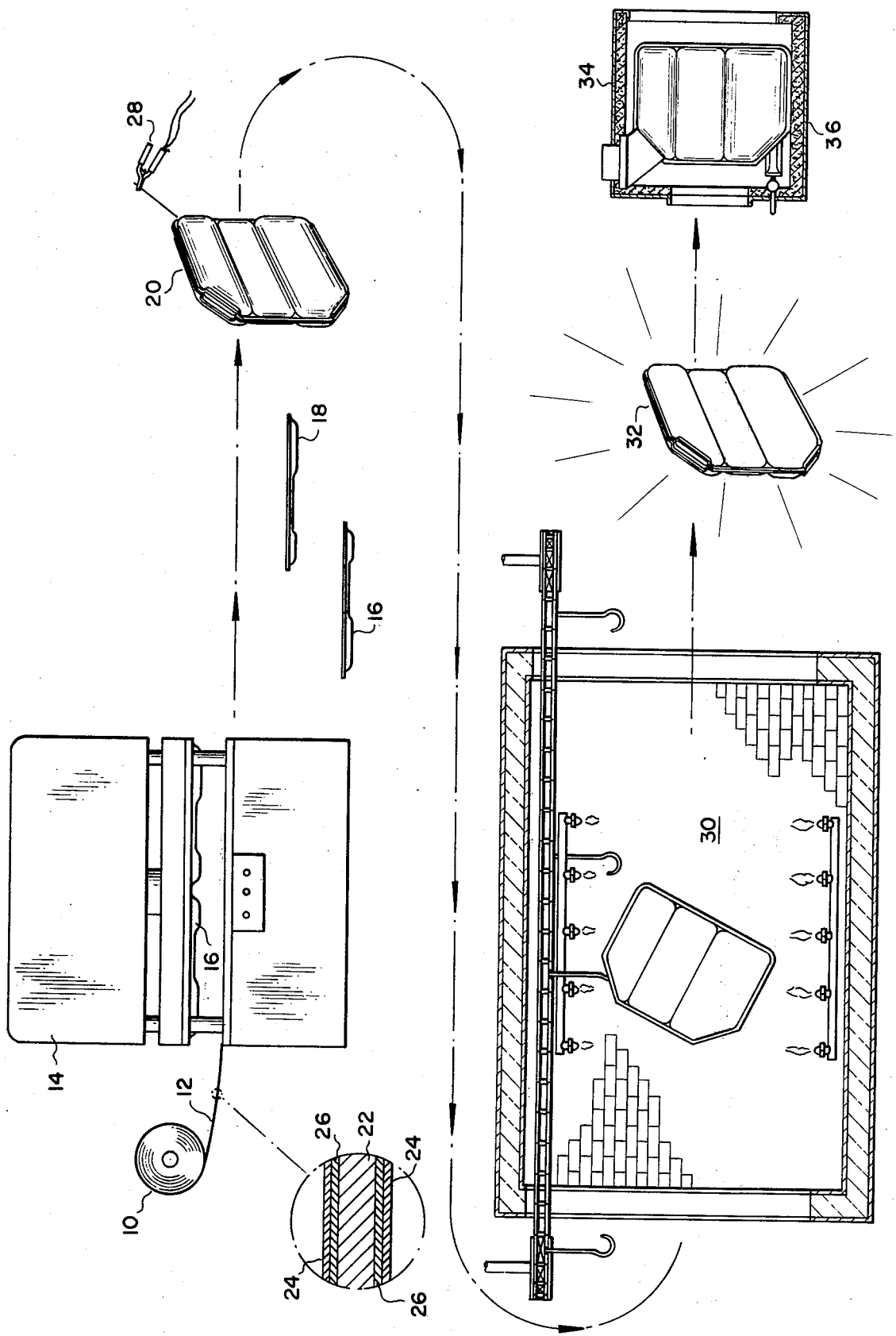

METHOD OF MAKING A GAS-FIRED FURNACE

BACKGROUND OF THE INVENTION

In the manufacture of gas-fired furnaces it is now customary to provide some form of corrosion protection for the heat exchangers used therein. One form of corrosion protection involves the use of procelainized heat exchangers. Another form involves the use of aluminized steel heat exchangers.

The steel sheet material used in aluminized heat exchangers may be coated in any conventional manner whereby a coating of aluminum is retained on the surface thereof. Outer coatings of aluminum and aluminum-silicon have been used for this purpose. A thin iron-aluminum alloy layer will normally exist between the outer coating and the steel substrate. Such coatings are normally accomplished by a hot-dip process wherein the sheet steel is dipped into molten aluminum and subsequently rolled. The aluminized steel sheet may also be constructed in other ways such as electroplating, diffusion cladding, vapor deposition, electrophoresis, slurry coating or by flame spraying. In either event the coating of aluminum is left on the surface and is considered to be highly instrumental in establishing the corrosion resistant characteristics attributed to heat exchangers of this construction.

SUMMARY OF THE INVENTION

This invention relates to gas-fired furnaces and the method of their manufacturer. More particularly this invention relates to a method by which prior and future furnace designs employing aluminized heat exchangers may be increased in efficiency whereby flue gas temperatures may be lowered, heat exchanger size reduced, furnace capacity increased or any combination of such effects may be achieved.

It is thus an object of this invention to provide a method of making a more efficient gas-fired furnace.

It is another object of this invention to provide a method of making a gas-fired furnace of improved efficiency without adversely affecting the corrosion resistance improvements heretofore made.

More specifically this invention involves a method of making a high efficiency gas furnace having an aluminized steel heat exchanger comprising the steps of: providing a metallic sheet material having a sheet substrate, an iron-aluminum alloy intermediate bonding layer overlying said substrate and substantially iron-free aluminum outermost layer overlying said intermediate layer; forming from said sheet material a plurality of concavo-convex sheet metal heat exchanger shells; connecting a pair of said heat exchanger shells together to form a hollow body heat exchanger; heating said heat exchanger shells substantially throughout within an oven to a temperature between 1065°F and 1800°F to improve the heat exchange efficiency of said heat exchanger shells; withdrawing said heat exchanger shells from said oven and cooling said heat exchanger shells substantially to ambient temperature; and installing said hollow body heat exchanger into a furnace housing.

DESCRIPTION OF THE DRAWINGS

The sole FIGURE illustrates schematically the process for the manufacture of a furnace in accordance with the teachings of the invention disclosed and claimed herein.

DETAILED DESCRIPTION

Now with reference to the drawing illustrating the invention it will be seen that a roll 10 of Type I or Type II aluminized steel 12 is fed into a forming press 14 having dies 16 for shaping right and left-hand concavo-convex half-shells 16 and 18 of a clamshell type heat exchanger 22.

The aluminized steel has a steel substrate with an outer coating of substantially iron-free aluminum 24 on opposite sides thereof. For purposes of this specification "substantially iron-free" means less than 5 percent iron by weight. Disposed between the substrate 22 and each of the outer layers 24 is an intermediate layer 26 usually consisting of an iron-aluminum alloy. For purposes of this specification "iron-aluminum alloy" means an aluminum and iron alloy containing in excess of 20 percent iron by weight. A typical thickness of each of these layers is as follows:

| | |
|---|---|
| Substrate layer 22 | 43 mils |
| Intermediate layer 26 | 0.5 mils |
| Outer substantially iron free aluminum layer 24 | 0.8 mils |

In Type I aluminized steel, the outer layer 24 will include silicon in alloy form with aluminum.

The halves 16 and 18 are subsequently arranged with their concave sides toward each other and welded as by arc, resistance or gas welding 28 to form an integral clamshell heat exchanger 20.

At this point it is customary in the prior art construction to install the aluminized heat exchanger clamshells in a furnace housing.

The instant invention contemplates an additional step prior to this installation of the clamshells. This added step includes passing the clamshells through an oven having an ordinary air atmosphere at elevated temperatures to thoroughly heat the clamshells to a temperature sufficiently high to melt the aluminum outer layer but lower than a temperature which would anneal the steel substrate. This temperature would be between about 1065°F and 1800°F. This may be accomplished by passing the clamshell 20 through oven 30 wherein the time within the heating atmosphere is in excess of 1 minute and less than 24 hours. A practical time of 5 minutes may be selected. During this step, the outermost surface of the clamshell is converted from substantially iron-free aluminum alloy to an iron-aluminum alloy. The exact nature of the metallurgical changes which take place have not been fully investigated. However, corrosion tests indicate that the heat exchanger's resistance to corrosion is not markedly decreased.

The clamshell heat exchanger is then removed from the oven 30 and allowed to cool as at 32. Subsequently the cooled heat exchanger is installed into a housing 34 of a gas-fired furnace 36.

It has been shown by experiment that the heat treatment provided by oven 30 has the effect of increasing the efficiency of the clamshell heat exchanger after installation within a furnace.

Thus as an example, I have constructed virtually two identical gas-fired furnaces using Type I aluminized steel of the same thickness and composition. The clamshell heat exchanger of one of the furnaces was heat treated for a period of 5 minutes to a temperature of 1500°F prior to installation in the furnace housing. The clamshell heat exchanger of the other furnace was not heat treated. The same furnace housing was used for both furnaces. The two furnaces were then operated under virtually identical conditions including heat input, circulating air quantity, circulating air temperature rise and excess combustion air above stoichiometric requirements.

Two tests were conducted in accordance with the test procedure set forth in *American National Standard For Gas-Fire Gravity And Forced Air Central Furnaces*, ANSI Z21. 47–1973. A first test involved "Flue Gas Temperature Test" set forth in Section 2.19 of this standard. The second test involved a "Thermal Efficiency Test" set forth in Section 2.9 of this standard.

In these tests, however, it is most notable that the stack gas temperature for the furnace employing the heat exchanger made in accordance with this invention was more than 40°F lower than the furnace employing a nontreated heat exchanger. Also the thermal efficiency of the furnace with the heat treated heat exchange was higher. The results of these tests were tabulated below.

FLUE GAS TEMPERATURE TEST

| Unit | Run | Leaving Stack Temperature °F | Input IN BTU Per Hour | Circulating Air Temperature Rise °F | % $CO_2$ In Flue Gas |
|---|---|---|---|---|---|
| Furnace With Type I Aluminized Heat Exchanger | 4–1 | 526 | 80,600 | 85.0 | 9.2 |
|  | 4–2 | 510 | 80,600 | 84.7 | 9.2 |
| Furnace With Type I Aluminized Heat Exchanger - Heat Exchange Heated to 1500°F for five minutes before installation | 1–4 | 466 | 80,600 | 84.0 | 9.0 |

THERMAL EFFICIENCY TEST

| Unit | Run | Input IN BTU Per Hour | Circulating Air Temperature Rise °F | % $CO_2$ In Flue Gas | Operating Efficiency |
|---|---|---|---|---|---|
| Furnace With Type I Aluminized Heat Exchanger | 3—3 | 80,500 | 85.7 | 5.6 | 77.5 |
| Furnace With Type I Aluminized Heat Exchanger - Heat Exchange Heated to 1500°F for five minutes before installation | 1–3 | 80,600 | 85.0 | 5.6 | 78.8 |

It will thus be seen that the invention herein disclosed teaches a method of constructing a more efficient heat exchanger. It will be understood that the substantially decreased stack gas temperature achieved in the first test example, may be used to alter the design and operating conditions to effectively reduce heat exchanger size, increase furnace capacity, increase furnace efficiency or reduce stack gas temperature or any combination as desired.

Having now described my invention in detail and recognizing that many changes may be made without departing from the spirit of my invention, I desire that my invention be limited only by the claims.

I claim:

1. A method of making a high efficiency gas furnace having aluminized steel heat exchangers comprising the steps of: providing a metallic sheet material having a steel substrate, an iron-aluminum alloy intermediate bonding layer overlying said substrate and substantially iron-free aluminum outer layer overlying said intermediate layer; forming from said sheet material a plurality of concavo-convex sheet metal heat exchanger shells; connecting a pair of said heat exchanger shells together to form a hollow body heat exchanger; heating said heat exchanger shells substantially throughout within an oven to a temperature between that necessary to melt said iron-free aluminum outer layer as a lower limit and that required to anneal said steel substrate as a higher limit to improve the heat exchange efficiency of said heat exchanger shells; withdrawing said heat exchanger shells from said oven and cooling said heat exchanger shells substantially to ambient temperature; and installing said hollow body heat exchanger into a furnace housing.

2. The method as defined in claim 1 wherein said heat exchanger shells are heated during said heating step to a temperature within the range of about 1065°F and about 1800°F.

3. The method as defined in claim 1 wherein said step of heating said heat exchanger shells is performed subsequent to said step of connecting said shells together to form a hollow body heat exchanger.

4. The method as defined in claim 2 wherein said heat exchanger shells are heated during said heating step to a temperature within the range of about 1400°F and about 1800°F.

5. The method as defined in claim 2 wherein said heat exchanger shells are heated to a temperature within the range of 1450°F and 1550°F.

6. The method as defined in claim 2 wherein said heat exchanger shells are heated to a temperature of about 1500°F.

7. The method as defined in claim 1 wherein said heat exchanger shells are heated for a sufficient duration to transform the outermost surface thereof from a substantially iron-free aluminum to an iron-aluminum alloy.

8. The method as defined in claim 6 wherein said heat exchanger shells are heated for a duration of between about 1 and 15 minutes.

9. The method as defined in claim 6 wherein said heat exchanger shells are heated for a duration of about 5 minutes.

10. The method as defined in claim 6 wherein said heat exchanger shells are heated to a temperature of about 1500°F for a period of about 5 minutes.

11. The method as defined in claim 6 wherein said heat exchanger shells are heated in a substantially air atmosphere within said oven.

* * * * *